(12) United States Patent
Kasai et al.

(10) Patent No.: US 8,982,926 B2
(45) Date of Patent: Mar. 17, 2015

(54) SPECTRUM SPREAD COMMUNICATION SYSTEM

(75) Inventors: Yuji Kasai, Ibaraki (JP); Masahiro Murakawa, Ibaraki (JP); Tetsuya Higuchi, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 193 days.

(21) Appl. No.: 13/704,087

(22) PCT Filed: Jun. 6, 2011

(86) PCT No.: PCT/JP2011/062909
§ 371 (c)(1),
(2), (4) Date: Dec. 13, 2012

(87) PCT Pub. No.: WO2011/158681
PCT Pub. Date: Dec. 22, 2011

(65) Prior Publication Data
US 2013/0089120 A1  Apr. 11, 2013

(30) Foreign Application Priority Data
Jun. 14, 2010  (JP) ................................ 2010-134937

(51) Int. Cl.
*H04B 1/00* (2006.01)
*H04B 1/7075* (2011.01)
(Continued)

(52) U.S. Cl.
CPC .............. *H04B 1/7075* (2013.01); *H04B 1/707* (2013.01); *H04B 1/70735* (2013.01); *H04B 3/542* (2013.01); *H04B 2203/5416* (2013.01); *H04J 13/16* (2013.01); *H04B 1/7073* (2013.01)
USPC ........... 375/141; 375/145; 375/362; 370/509; 370/512

(58) Field of Classification Search
USPC ................. 375/140, 141, 145, 149, 354, 362, 375/365–367; 370/503, 509, 510, 512, 513
See application file for complete search history.

(56) References Cited

U.S. PATENT DOCUMENTS 5,699,380 A  12/1997 Sugita
5,966,416 A * 10/1999 Hendrickson ................. 375/367
(Continued)

FOREIGN PATENT DOCUMENTS

CN  1080485 C  3/2002
CN  101729089 A  6/2010
(Continued)

OTHER PUBLICATIONS

PCT Search Report for PCT Serial No. PCT/JP2011/062909 dated Jul. 14, 2011.
(Continued)

*Primary Examiner* — Dac Ha
(74) *Attorney, Agent, or Firm* — McCormick, Paulding & Huber LLP (57) ABSTRACT

Disclosed is a spectrum spread communication system which is hardly influenced by noises, and in which a frame structure can be identified at a receiving side without use of a frame synchronization signal. A spread code generator switches spread codes ("Scai" and "Scbi") in each frame, and outputs it to a spread modulation unit. The spread modulation unit performs spread modulation of transmission data, and transmits it to a direct current power line. A reference code generator generates reference codes ("Scai" and "Scbi") in the same code phase. Spread demodulation units performs spread demodulation of the received signal with use of the reference codes ("Scai" and "Scbi"), and output it to a selection unit. A frame synchronization detection unit identifies a frame structure on the basis of switching of a synchronization state of a code phase in a code phase synchronization detection unit. The selection unit outputs reception data by selecting spread demodulated data from the spread demodulation unit which is in a phase-synchronized state.

6 Claims, 7 Drawing Sheets

(51) Int. Cl.
*H04B 1/707* (2011.01)
*H04B 3/54* (2006.01)
*H04J 13/16* (2011.01)
*H04B 1/7073* (2011.01)

(56) References Cited

U.S. PATENT DOCUMENTS

| | | | |
|---|---|---|---|
| 6,625,239 B1 * | 9/2003 | Shiraishi et al. | 375/354 |
| 6,738,393 B2 | 5/2004 | Miki et al. | |
| 7,684,466 B2 * | 3/2010 | Sasaki et al. | 375/146 |
| 2008/0147335 A1 | 6/2008 | Adest et al. | |
| 2012/0134391 A1 * | 5/2012 | Myers et al. | 375/141 |

FOREIGN PATENT DOCUMENTS

| | | |
|---|---|---|
| JP | 2-75240 A | 3/1990 |
| JP | 05-037517 | 2/1993 |
| JP | 5-191379 A | 7/1993 |
| JP | 8-186521 A | 7/1996 |
| JP | 8-251076 A | 9/1996 |
| JP | 2001-148647 A | 5/2001 |
| JP | 3511520 B2 | 3/2004 |
| JP | 2010-512139 A | 4/2010 |

OTHER PUBLICATIONS

Article entitled: Frame synchronisation for frequency redundant transmission of data over power lines, by Arzherger M. et al.; Spread Spectrum Techniques and Applications Proceedings, 1996, IEEE 4 th International Symposium on Mainz, Germany, Sep. 22-25, 1996, New York, NY, USA, IEEE, US; vol. 3, Sep. 22, 1996 pp. 1092-1096, XP01028787, DOI: 10.1109/ISSTA.1996.563474 ISBN: 978-0-7803-3567-7.
Supplemental European Search Report for EP Application Serial No. 11 79 5589 dated Dec. 4, 2013.
Chinese Office Action and English Translation for Application Serial No. 201180029179.8 dated Jan. 24, 2014.
Chinese Office Action and English Translation for Application Serial No. 201180029179.8 dated Sep. 30, 2014.

* cited by examiner

SPECTRUM SPREAD COMMUNICATION SYSTEM

CROSS REFERENCE TO RELATED APPLICATIONS

This application is entitled to the benefit of and incorporates by reference essential subject matter disclosed in International Patent Application No. PCT/JP2011/062909 filed on Jun. 6, 2011 and Japanese Patent Application No. 2010-134937 filed Jun. 14, 2010.

TECHNICAL FIELD

The present invention relates to a communication system which performs spectrum spread modulation of frame-structured transmission data, and transmits the data.

BACKGROUND ART

Figure 7:
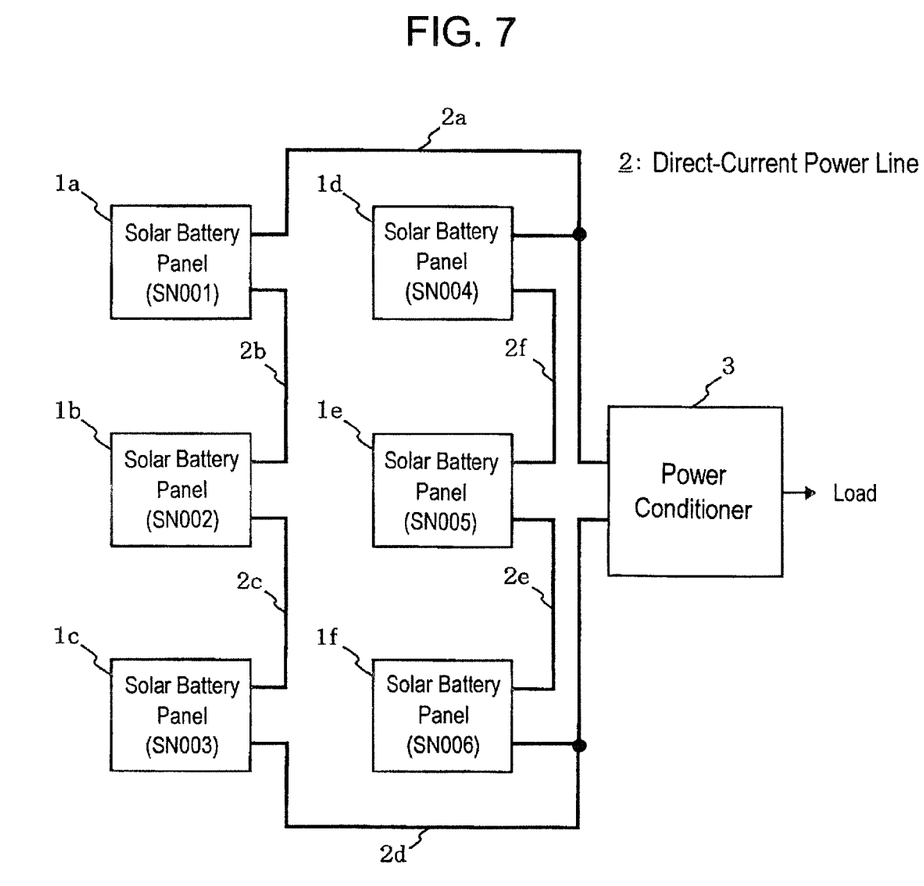
FIG. 7 is a block configuration diagram showing a conventional solar power generation system.

FIG. 7 is a block configuration diagram showing a conventional solar power generation system.

In this figure, reference characters "1a" to "1f" denote respective solar battery panels, reference characters "2a" to "2f" denote respective direct current power lines, and reference character "3" denotes a power conditioner. Each of the solar battery panels 1a to 1f is a panel-shaped product configured to obtain required voltage and current by connecting a plurality of solar batteries in series/parallel, and also referred to as "solar battery module".

In this system, the solar battery panels 1a to 1f are connected in series or in parallel via the direct current power lines 2a to 2f, and direct-current power generated in the solar battery panels 1a to 1f by solar power generation is supplied to a load via the power conditioner 3. The direct-current power is converted by the power conditioner 3 to alternating-current power.

In introduction of renewable energy for realizing a low carbon society, it is extremely important to diffuse the use of solar power generation. Although it is generally said that the lives of the solar battery panels 1a to 1f are about 20 years, it is difficult to completely eliminate the failure of the solar battery panels since they are industrial products. In addition, it is difficult to find out whether each of the solar battery panels 1a to 1f is in a failure state.

As a result, a monitoring system for the solar battery panels 1a to 1f is required to be introduced without being increased in production and installation cost.

In a solar power generation system of an ordinary house, once the solar battery panels 1a to 1f are installed on a roof, the solar battery panels are rarely subjected to maintenance. Therefore, even when failure of the solar battery panels 1a to 1f is expected on the basis of reduction in output, under current circumstances, it is not possible to specify one or more failed solar battery panels from among the solar battery panels 1a to 1f. As a result of the fact that one or more failed solar battery panels are left untouched in the solar battery panels 1a to 1f, the power to be originally expected to be generated may be lost and the ability of the introduced solar power generation system may not be fully utilized.

If power generation information of the solar battery panels 1a to 1f can be transmitted by utilizing the direct current power lines 2a to 2f for communication with no change, power generation monitoring can be carried out at low cost without providing new communication cables.

However, generally, large noises are generated on the direct current power lines 2a to 2f through which the power generated by the solar battery panels 1a to 1f is being transmitted. As a result, troubles may occur in communication due to the noises, and the communication may not be carried out.

Generally, in a harsh transmission environment, a spectrum spread communication method and error correcting codes increased in redundant bits are employed. A frame-structured transmission data is assembled and transmitted, and re-transmission control (ARQ: Automatic Repeat reQuest) is carried out in a frame unit. Error detection and error correction are carried out in the frame unit in many cases.

As a result, a frame synchronization signal inserted to the top of a frame or a frame synchronization signal decentrally disposed in transmission data in each frame is transmitted for frame synchronization (see Japanese Patent No. 3511520, however, this technique does not use the spectrum spread communication method).

However, if a frame synchronization signal is inserted into transmission data which is short in frame length, transmission efficiency is reduced. For example, if a frame synchronization signal of 16 to 32 bits is inserted into a frame of 64 bits, there is a problem that transmission efficiency is significantly reduced.

SUMMARY

In order to solve the above-described problem, the present invention has been made, and it is an object of the present invention to provide a spectrum spread communication system which can perform stable communication without being easily affected by noises, and identify a frame structure in a receiving side without inserting a frame synchronization signal in a transmitting side.

In the present invention, a spectrum spread communication system performs spectrum spread modulation and transmission of frame-structured transmission data, in which the spectrum spread communication system performs spread modulation of the frame-structured transmission data, to which a plurality of spread codes are allocated, by switching and using the spread codes in each frame, transmits a spread-modulated signal to a transmission line, has a plurality of spread demodulation systems respectively using a plurality of reference codes corresponding to the spread codes, the spread modulation systems performing spread demodulation of the spread-modulated signal received via the transmission line, identifies the frame structure on the basis of timing of switching from one spread demodulation system to another spread demodulation system in which the spread-modulated signal and the reference codes are in phase synchronization state, and outputs received data by selecting an output of the spread demodulation system that is in phase synchronization state.

Since spectrum spread modulation of the transmission data to be transmitted is performed, it is possible to perform stable communication without being easily affected by noises.

It is possible to identify the frame structure in the receiving side by switching and selectively using the spread codes in each frame in the transmitting side. Therefore, it is possible to identify the frame structure in the receiving side without inserting a frame synchronization signal into the transmission data in the transmitting side.

In the present invention, a first spread code and a second spread code are allocated as the spread codes, and the spectrum spread communication performs spread modulation of the frame-structured transmission data by alternatively switching and using the first spread code and the second spread code in each frame, has first and second spread demodulation systems as the spread demodulation systems, and identifies the frame structure on the basis of timing of alternatively switching between first and second spread modulation systems in which the spread-modulated signal and the reference codes are in phase synchronization state.

Therefore, it is possible to identify the frame structure only by allocating the small number of spread codes to the transmitting side.

In the present invention, the transmission line is a transmission line through which direct-current power is supplied, the spread-modulated signal is superimposed on the direct-current power as a change in current flowing along the transmission line, and spread-modulated signal received via the transmission line is received as a change in voltage of the transmission line.

In general, an internal resistance of a transmission line through which direct-current power is supplied, such as a direct current power line through which power generated by solar battery panels is transmitted, is small. Therefore, it is possible to easily superimpose the spread-modulated signal on the transmission line by changing current rather than voltage of the transmission line.

In the present invention, the spectrum spread receiving apparatus comprises: reference code generating means for generating a plurality of reference codes corresponding to the spread codes in the same code phase; spread demodulation means of a plurality of systems, each of which uses the reference codes generated by the reference code generating means and performs spread demodulation of the spread-modulated signal received via the transmission line; reference code phase synchronization means which controls phase of the reference code generating means so that the spread-modulated signal and one of the reference codes are in phase synchronization state on the basis of demodulated signals demodulated in the spread demodulation means of the systems; and frame synchronization detecting means which obtains the frame synchronization signal on the basis of timing of switching from a state in which the spread-modulated received signal and one of the reference codes are in phase synchronization state to a state in which the spread-modulated received signal and another one of the reference codes are in phase synchronization state.

Therefore, the spectrum spread receiving apparatus used in the spectrum spread communication system can be realized by a simple configuration.

In the present invention, the spectrum spread communication system is used in a communication system in which code division multiple access is performed between a plurality of transmitting devices and a single receiving device, the spread codes are allocated to the transmitting devices so that the allocated spread codes differ among the transmitting devices, the single receiving device has a plurality of spread demodulation systems which respectively use the reference codes corresponding to all of the spread codes allocated to the transmitting devices; and specifies a device which received monitoring data corresponding to data obtained by selecting the output of the relevant spread demodulation system, by identifying the reference code which is used in the spread demodulation system in which the spread-modulated signal and the reference code are in phase synchronization state.

Therefore, the transmitting devices and the single receiving device can share the transmission line.

In the present invention, in the spectrum spread communication system, the transmitting devices are adapted to transmit monitoring data obtained by respectively monitoring states of a plurality of devices, to the single receiving device as the frame-structured transmission data; each of the devices has unique data for specifying the relevant devices; a plurality of spread codes respectively allocated to the transmitting devices are codes which are allocated in advance to the transmitting devices in association with unique data for specifying a device which received monitoring data transmitted by the relevant transmitting device, the single receiving device specifies a device which received monitoring data corresponding to data obtained by selecting the output of the relevant spread demodulation system, by identifying the reference code which is used in the spread demodulation system in which the spread-modulated signal and the reference code are in phase synchronization state.

Therefore, without inserting unique data necessary to specify a device into the transmission data, and transmitting it, the device from which monitoring data corresponding to received data was obtained can be specified in the single receiving device.

In the present invention, in the spectrum spread communication system, the transmission line is a direct current power line through which power generated by a plurality of solar battery panels is supplied to a load, the frame-structured transmission data is monitoring data for the solar battery panels, measured by a measuring device provided to each of the solar battery panels, the transmitting devices are respectively provided to the solar battery panels, and the receiving device is provided to a device for monitoring the solar battery panels.

Generally, large noises are generated on a direct current power line through which power generated by a solar battery panel is transmitted. The monitoring data of the solar battery panel can be transmitted by using such a direct current power line without additionally providing a dedicated communication cable. Therefore, it is possible to perform power generation monitoring of the solar battery panel at low cost.

As an effect of the above-described invention, it is possible to stably and efficiently transmit frame-structured transmission data without being easily affected by noises. As a result, communication failure caused by noises is prevented from being, and a highly-reliable communication system which can efficiently superimpose a signal to the power line to perform communication is realized without newly providing wiring for communication.

BRIEF DESCRIPTIONS OF THE DRAWINGS

Hereinafter, embodiments of the present invention will be described in detail with reference to the drawings.

DETAILED DESCRIPTION

Figure 1:
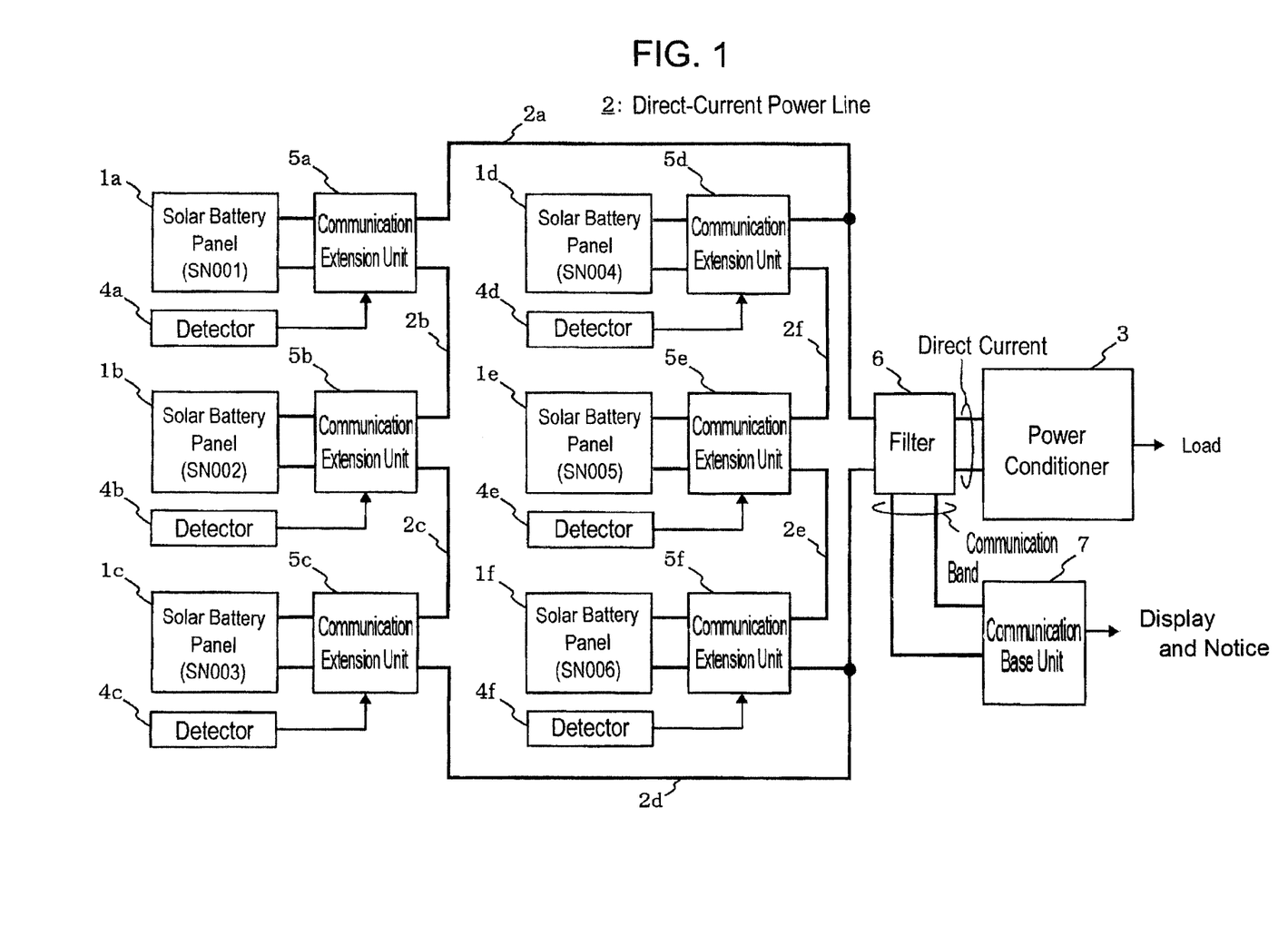
FIG. 1 is a block configuration diagram showing one specific example to which one embodiment of the present invention is applied.

FIG. 1 is a block configuration diagram showing one specific example to which one embodiment of the present invention is applied.

The basic configuration of a solar power generation system is the same as that of the conventional art shown in FIG. 7, and members the same as those of the conventional art are denoted by the same reference numbers as those of the conventional art.

Measurement data of one or more solar battery panels 1a to 1f are transmitted by communication extension units (transmitting devices) 5a to 5f respectively provided at the solar battery panels 1a to 1f, transmission data of the one or more solar battery panels 1a to 1f are superimposed on and transmitted via direct current power lines 2a to 2f for solar power generation, and the transmission data is received by one communication base unit (receiving device) 7 connected to the direct current power lines 2a to 2f.

In this embodiment, the solar battery panels 1a to 1f are provided with detectors 4a to 4f and the communication extension units 5a to 5f, respectively.

The detectors 4a to 4f monitor power generating states of the solar battery panels 1a to 1f, respectively, are typically one or more measuring devices provided to the solar battery panels 1a to 1f, and will be described later with reference to FIG. 2.

The communication extension units 5a to 5f are transmitting devices which transmit detection values, more specifically, measurement values detected by the detectors 4a to 4f provided to the solar battery panels 1a to 1f, to the communication base unit 7 by using the direct current power lines 2a to 2f as transmission lines. Therefore, each of the communication extension units 5a to 5f can be also referred to as a measurement communication circuit.

In the example shown in this figure, the relations of the connection between the detectors 4a to 4f and the solar battery panels 1a to 1f are not clearly shown, and the relations of the connection are different depending on what is monitored by the detectors 4a to 4f.

On the other hand, a filter 6 is inserted to the direct current power lines 2a and 2d in the vicinity of the power conditioner 3. The filter 6 distributes the direct current or frequency components close to direct currents between the direct current power lines 2a and 2d to the power conditioner 3 and distributes the frequency components of transmission signals superimposed between the direct current power lines 2a and 2d, for example, a band of 1 [kHz] to 10 [kHz] to the communication base unit 7.

The communication base unit 7 receives the transmission signals transmitted by the communication extension units 5a to 5f, thereby obtaining data for monitoring the state of the solar battery panels 1a to 1f, such as measurement data, and the communication base unit 7 causes a monitor device (not shown) to display the state of the solar battery panels, or causes a trouble warning device to give warning about failure.

The above-described filter 6 and communication base unit 7 are, for example, mounted in a chassis of the conventional power conditioner 3 together with the monitoring device and the warning device.

As described above, the direct current power lines 2a to 2f through which the communication extension units 5a to 5f are connected in series or in parallel are connected to the single communication base unit 7 via the filter 6. Therefore, the communication extension units 5a to 5f, the direct current power lines 2a to 2f, and the communication base unit 7 are necessary to constitute a multiplex communication system.

Figure 4:
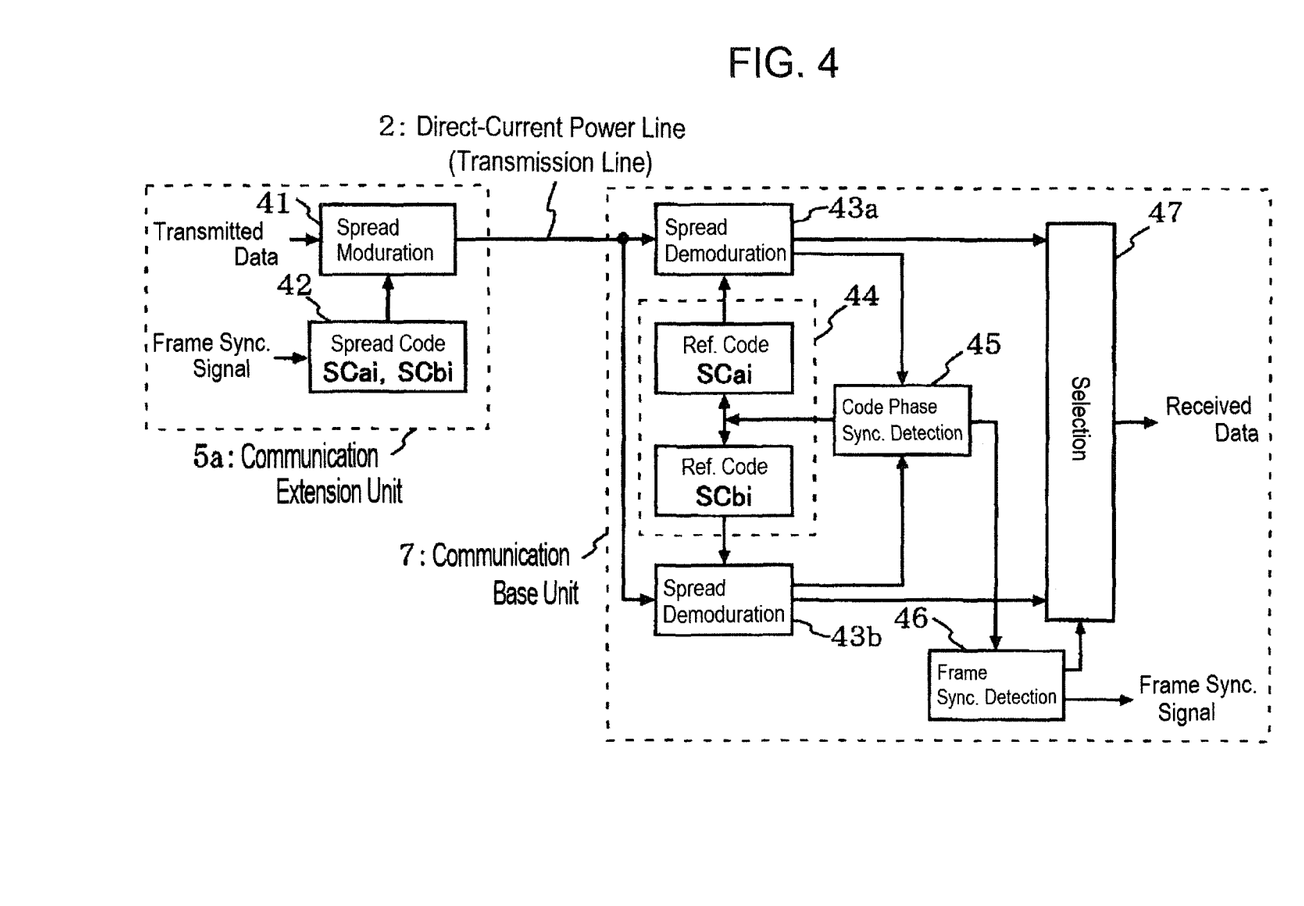
FIG. 4 is a block configuration diagram showing one embodiment of the present invention.
Figure 5:
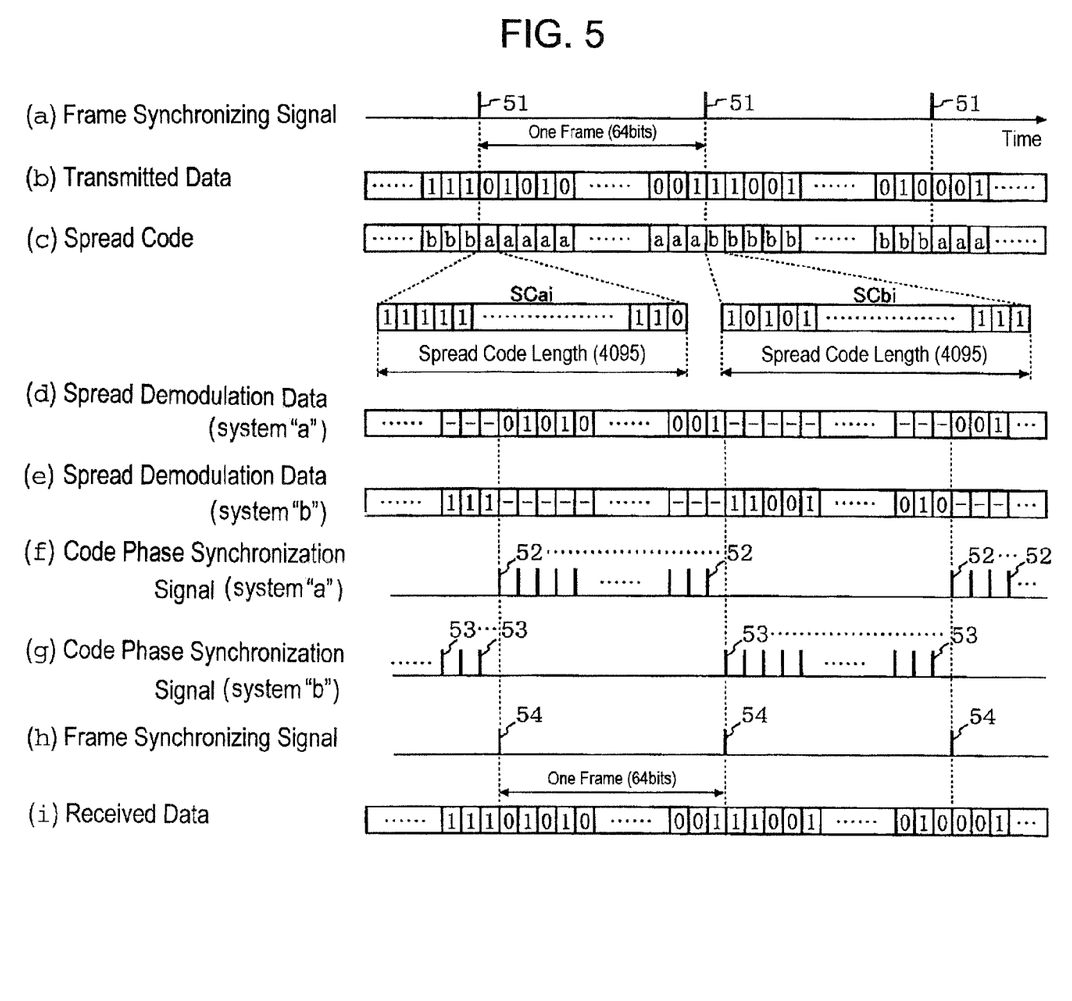
FIG. 5 is an explanatory diagram schematically showing signal processing in the block configuration diagram shown in FIG. 4.

In one embodiment of the present invention, as shown in FIGS. 4 and 5, a direct spectrum spread (Direct Spectrum Spread) modulation method (hereinafter simply referred to as "spread modulation") is employed as a transmission method, and a code division multiple access (CDMA: Code Division Multiple Access, also referred to as "code division multiple access") is employed as a multiplex communication system.

Figure 2:
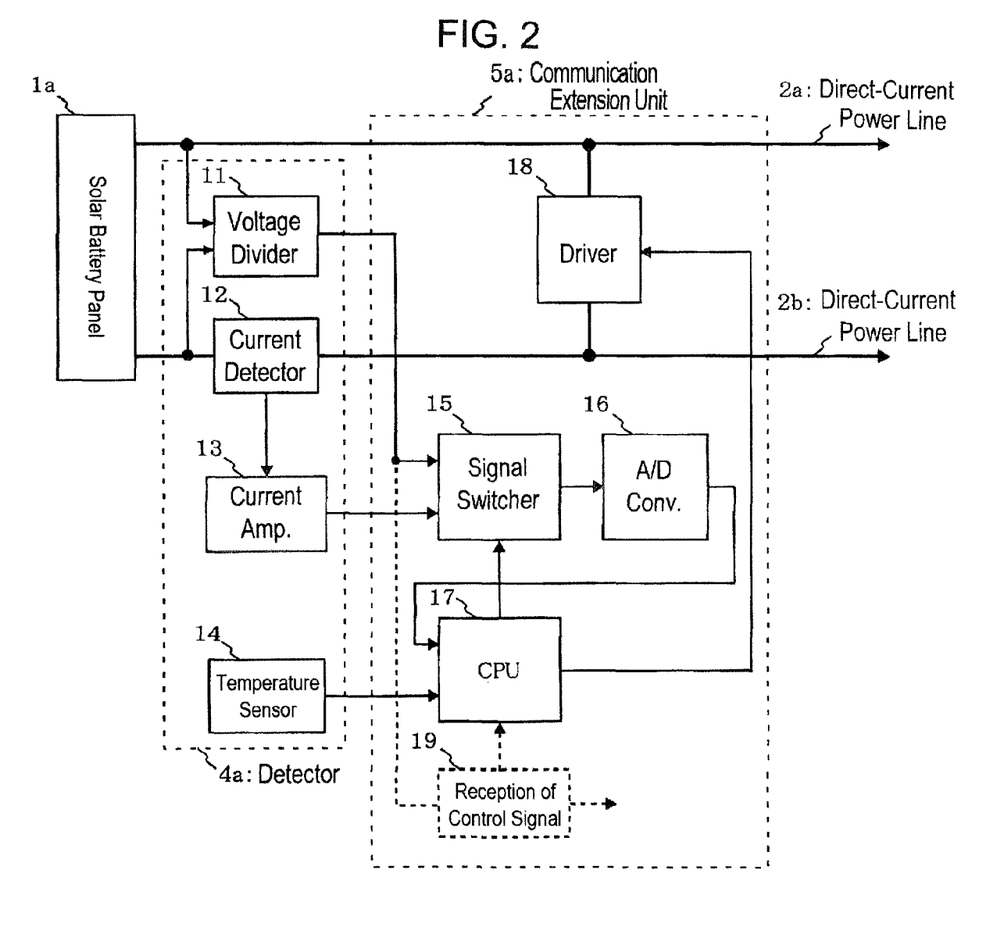
FIG. 2 is a block configuration diagram showing one example of a communication extension unit in FIG. 1.

FIG. 2 is a block configuration diagram showing one example of the detector and the communication extension unit shown in FIG. 1.

Since the detectors 4a to 4f are the same in configuration as each other, and the communication extension units 5a to 5f are the same in configuration as each other, the detector 4a and the communication extension unit 5a are shown on behalf of them.

In this figure, reference number "11" denotes a voltage divider, reference number "12" denotes a current detector, reference number "13" denotes a current amplifier, and reference number "14" denotes a temperature sensor. These elements constitute one specific example of the detector 4a shown in FIG. 1. The voltage divider 11 divides the output voltage of the solar battery panel 1a on the basis of an A/D convertible voltage level. The current detector 12 is for measuring the output current of the solar battery panel 1a with use of, for example, a semiconductor Hall-effect element or a resistor having a minute resistance value. The current amplifier 13 performs conversion to a voltage proportional to the output current of the solar battery panel 1a detected by the current detector 12, and amplifies this voltage on the basis of an A/D convertible voltage level. The temperature sensor 14 measures the temperature of the solar battery panel 1a, and outputs it to a CPU 17 in a digital value.

A signal switch 15, a central processing unit (CPU) 17, and a driver 18 are a specific example of the communication extension unit 5a shown in FIG. 1.

The signal switch 15 switches the output voltage of the voltage divider 11 and the output voltage of the current amplifier 13 on the basis of commands from the CPU 17 and outputs it to an A/D converter 16. When the temperature sensor 14 outputs an analog voltage, this output serves as a third input to the signal switch 15.

The A/D converter 16 converts the output voltage of the signal switch 15 to a digital value and outputs it to the CPU 17. Therefore, the voltage, current and temperature of the solar battery panel 1a converted to the digital value by the A/D converter 16 are input to the CPU 17.

The CPU 17 assembles a frame structure of these measurement data with use of, for example, 64 bits as a frame unit. This frame includes not only measurement data but also redundant bits for error detection and correction.

The CPU 17 further carries out spread modulation of each bit of the data to be transmitted by using spread code sequence SC (hereinafter simply referred to as "spread code"). Here, the spread code SC is pseudo random code (PN) such as gold code. The cycle of the spread code SC is, for example, 4095. If the spread codes having a long cycle are used, communication can be performed without being easily affected by noises.

The driver (drive circuit) 18 amplifies a spread-modulated transmission signal to an amplitude suitable for transmission, and superimposes the amplified signal on the direct current power lines 2a and 2b.

Here, since the direct current power lines 2a and 2b are lines which supply direct-current power of the solar battery panel 1a, it is necessary to devise a way of superimposing the transmission signal.

Under the condition that maximum power is being obtained from the solar battery panel 1a, the internal resistance of the solar battery panel 1a is small, and the internal resistance between the direct current power lines 2a and 2b is also small. Therefore, if the transmission signal is superimposed as a change in voltage, since it is necessary to flow a large current to the driver 18, the internal loss of the driver 18 is increased, and this method is not suitable for implementation.

Figure 6A:
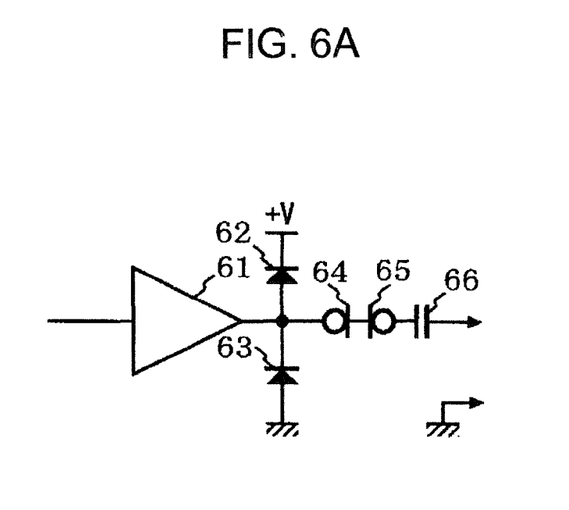
FIGS. 6A and 6B are a circuit diagram showing one specific example of a driver in the communication extension unit shown in FIG. 2.

On the other hand, even if the internal resistance between the lines is small, it is easy to superimpose the transmission signal as a change in current. Therefore, in FIG. 2, the driver 18 serves as a current driver, and a bypass is provided between the direct current power lines 2a and 2b and connected in parallel with the solar battery panel 1a. The driver 18 superimposes the spread-modulated signal on the direct current power lines 2a and 2b as a change in current flowing through the direct current power lines 2a and 2b. The driver 18 like this is realized, for example, by a circuit which will be described later with reference to (a) in FIG. 6.

Figure 6B:
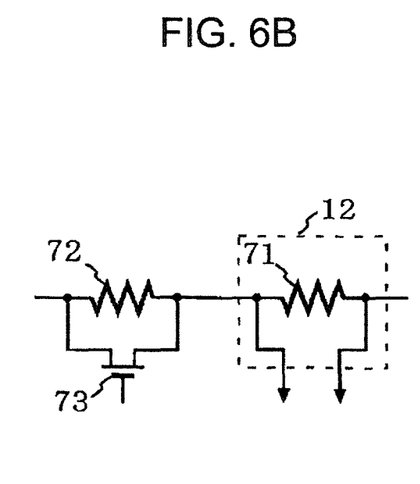

On the other hand, a driver to which the spread-modulated signal is input can be inserted to either one of the direct current power lines 2a and 2b, and connected in series with the solar battery panel 1a. The driver like this is realized, for example, by a circuit which will be described later with reference to (b) in FIG. 6.

The above-described signal switch 15, A/D converter 16 and CPU 17 are realized, for example, by a 1-chip microcomputer with a built-in A/D converter. The communication extension unit 5a provided with the 1-chip microcomputer and the driver 18, and partly or all of the above-described detector 4a can be mounted on a specific portion of the solar battery panel 1a, for example, a terminal box of the solar battery panel 1a.

Additionally, the communication extension unit 1a is provided with a control signal receiving device 19. This case will be explained at the end of the specification of the present application.

Figure 3:
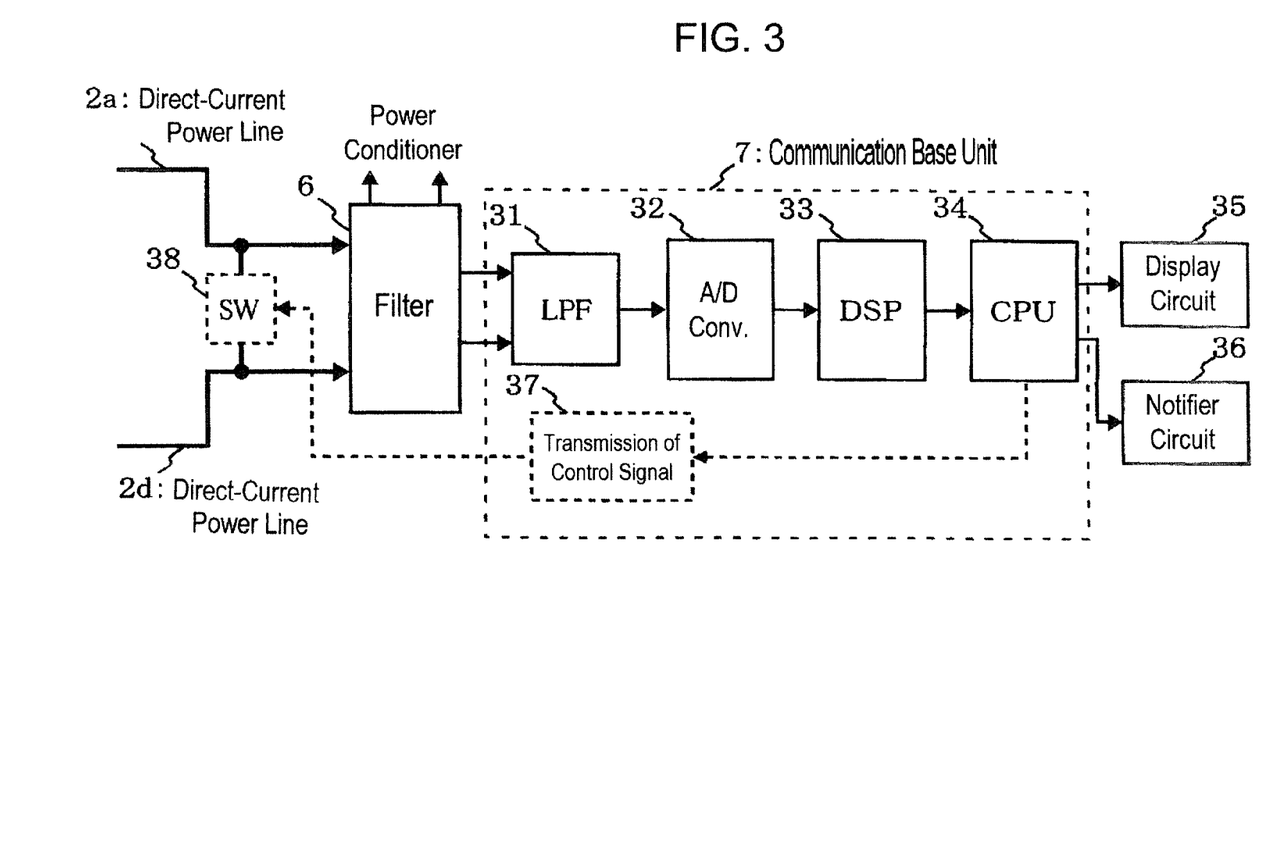
FIG. 3 is a block configuration diagram showing one example of a communication base unit in FIG. 1.

FIG. 3 is a block configuration diagram showing one example of the communication base unit 7 shown in FIG. 1.

In the drawings, reference number "31" denotes a low-pass filter (LPF). The low-pass filter 31 is electrically connected to the filter 6 shown in FIG. 1, and limits the bandwidth of signals so that aliasing noise is not generated in a subsequent A/D converter 32.

Reference number "32" denotes the A/D converter, reference number "33" denotes a digital signal processor (DSP), and reference number "34" denotes a central processing unit (CPU). The A/D converter 32 converts the spread-modulated received signal passed through the LPF 31 to digital value.

The low-pass filter 31, the A/D converter 32, the DSP 33, and the CPU 34 constitute one specific example of the communication base unit 7 shown in FIG. 1.

The A/D converter 32, the DSP 33, and the CPU 34 are realized by, for example, a one-chip microcomputer with a built-in A/D converter. Reference number "35" denotes a display circuit which displays monitoring data on a screen, and reference number "36" denotes a warning circuit which warns failure by sound.

As explained with reference to FIG. 2, in the communication extension unit 5a, the spread-modulated transmission signal is superimposed on the direct current power lines so as to correspond to a change in current flowing through the direct current power lines.

On the other hand, at the position of the power conditioner 3 on the direct current power lines 2a and 2d, the above-described change in current is received as a change in line voltage corresponding to current-voltage characteristics of a case in which the solar battery panels 1a to 1f are connected in series/parallel to each other. Therefore, in the communication base unit 7, the spread-modulated received signal can be processed as a line-to-line voltage value of the direct current power lines 2a and 2d.

The DSP 33 carries out digital signal processing (for example, product-sum operations) of the spread-modulated received signals to perform spread demodulation of the received data transmitted from the communication extension units 5a to 5f by using spread codes, and then outputs the received data to the CPU 34. The spread demodulation is on the basis of the repeatedly carrying out product-sum operations of the digital values of the received signals and the spread codes.

Synchronization of code phases, in other words, data bits can be achieved by searching for the timing to reach the maximum value of the absolute value of the result of the product-sum operation.

Additionally, in the above-described A/D converter 32, when A/D conversion is performed with, for example, twice the spread modulation speed (chip rate) of the transmission data (over sampling), timing of code phases can be easily adjusted, which is preferred.

The CPU 34 reassembles the received data obtained by spread demodulation of the spread-modulated received signals transmitted from the communication extension units 5a to 5f, into frame structure, and outputs the voltages, currents, and temperatures of the solar battery panels 1a to 1f to the display circuit 35.

The CPU 34 also determines whether or not there is failure in voltage, current, or temperature of the solar battery panels 1a to 1f, and when the CPU 34 determines that it is necessary to issue a warning, the CPU 34 outputs this determination to the warning circuit 36.

Additionally, the communication base unit 7 may be provided with a control signal transmitting device 37 and a switch 38, and this case will be explained at the end of the specification of the present application.

FIG. 4 is a block configuration diagram showing one embodiment of the present invention.

This block configuration diagram shows one-to-one structured spectrum spread communication system in which a direct current power line 2 between one communication extension unit (which will be explained hereinafter as a communication extension unit 5a) and one communication base unit 7 is used as a transmission line, and which performs spectrum spread modulation of frame-structured transmitted data, and transmission of this data.

In the communication extension unit (transmitting device) 5a, reference number "41" denotes a spread modulation unit, and reference number "42" denotes a spread code generator. A plurality of spread codes, for example two spread codes "Scai" and "Scbi" (i=1) in this figure, are allocated in advance to the single communication extension unit 5a. Here, this character "i" is an integer value corresponding to the communication extension units 5a to 5f, and a plurality of spread codes "Scai" and "Scbi" are individually allocated to the communication extension units 5a to 5f. The spread codes "Scai" and "Scbi" (i=1 to 6) are different from each other.

In the communication extension unit (transmitting device) 5a, the spread code generator 42 switches the spread codes "Scai" and "Scbi" in each frame, and outputs the code to the spread modulation unit 41. The spread modulation unit 41 performs spread modulation of the frame-structured transmission data by using the spread codes "Scai" and "Scbi" from the spread code generator 42, and transmits the spread-modulated signal to the direct current power line (transmission line) 2.

In the communication base unit (receiving device) 7, a reference code generating unit 44 generates a plurality of reference codes "Scai" and "Scbi" (the same as the spread codes) corresponding to the plurality of spread codes "Scai" and "Scbi" allocated to the communication extension unit 5a in the same code phase.

Also, the communication base unit (receiving device) 7 has a plurality of spread demodulation systems each using the plurality of reference codes "Scai" and "Scbi", and in an example shown in the figures, the communication base unit (receiving device) 7 has a system "a" and a system "b".

The reference code "Scai" in the system "a" is supplied to a spread demodulation unit 43a in the system "a", while the reference code "Scbi" in the system "b" is supplied to a spread demodulation unit 43b in the system "b".

The spread demodulation unit 43a in the system "a" and the spread demodulation unit 43b in the system "b" perform spread demodulation, that is, reverse spread of the spread-modulated signal received via the direct current power line 2 by using the reference codes "Scai" and "Scbi" supplied from the reference code generating unit 44, and outputs the spread demodulated data of the system "a" and the system "b" (values after level determination of the accumulated added values of the product-sum operation) to a selection unit 47.

In the spread demodulation process, a code phase synchronization detection unit 45 controls the phase of the reference code output from the reference code generator 44 on the basis of signals demodulated in the spread demodulation units 43a and 43b (correlation output values before level determination) so that the above-described spread-modulated signal and any one of the reference codes "Scai" and "Scbi" are synchronized in phase.

A frame synchronization detection unit 46 outputs a frame synchronization signal on the basis of the synchronization state of the code phase in the code phase synchronization detection unit 45. More specifically, the frame synchronization signal for identifying the frame structure is output on the basis of timing of switching from a state in which the spread-modulated received signal and one of the reference codes "Scai" and "Scbi" (for example: "Scai") in the spread demodulation units 43a and 43b of the systems "a" and "b" are in phase synchronization state to a state in which the spread-modulated received signal and the other of the reference codes "Scai" and "Scbi" (for example: "Scbi") are in phase synchronization state.

In other words, a spread demodulation system which is in phase synchronization with reference code in current use outputs the frame synchronization signal on the basis of timing of switching from one spread demodulation system to another spread demodulation system (system "a"→system "b", or system "b"→system "a").

Since the reference codes "Scai" and "Scbi" are generated in the same code phase, even if it performs switching of spread demodulation systems which are in phase synchronization state, the code phase does not get out synchronization.

When the frame synchronization signal is output, the selection unit 47 selects spread demodulated data from the spread demodulation unit 43a in the system "a" or the spread demodulation unit 43b in the system "b", which is in phase synchronization state, thereby outputting the received data corresponding to the transmission data of the communication extension unit 5a. In addition, from the frame synchronization detection unit 46, the selection unit 47 can identify the spread demodulation system which is in phase synchronization state by obtaining information about timing of switching from the system "a" to the system "b", or timing of switching in the reverse direction.

The frame synchronization signal is used for identifying the frame structure of the received data from the selection unit 47 in subsequent processing units, extracting a redundant code to carry out error detection and correction and separation into a plurality of measurement data.

FIG. 5 is an explanatory diagram schematically showing signal processing in the block configuration diagram shown in FIG. 4.

in FIG. 5 shows a frame synchronization signal in the communication extension unit 5a. Reference number "51" denotes generation timing of the frame synchronization signal. The horizontal axis shows time passage. (b) in FIG. 5 shows a bit stream of the transmission data in the communication extension unit 5a. In one example shown in this figure, one frame of this frame structure is 64 bits.

As one example, the transmission speed (bit rate) of the transmission data is 5 [bps].

In the spread modulation unit 41 shown in FIG. 4, spread modulation is performed by alternately switching spread codes "Scai" and "Scbi" in each frame, as shown in (c) of FIG. 5, in connection with data frame (frame-structured transmission data) to be transmitted.

(c) in FIG. 5 shows the spread codes "Scai" and "Scbi" (i=1) output by the spread code generating unit 42. The code length (i.e., length of one cycle) of each code is 4095. In this figure, character "a" represents the spread code "Scai", and character "b" represents the spread code "Scbi". Here, "11111 . . . 110" of the spread code "Scai" and "10101 . . . 111" of the spread code "Scbi" shown in this figure are shown for the purpose of explanation, but they are different from actual bit streams.

One period of each spread code "Scai" and "Scbi" of (c) in FIG. 5 correspond to a 1-bit period of the transmission data. Therefore, 1/4095 of 1-bit period is a 1-chip period of the spread code.

The spread modulation unit 41 transmits the spread code "SCai" with no change when the transmission data (b) in FIG. 5 is "1", and the spread modulation unit 41 inverts and transmits the spread code "SCai" when the transmission data (b) is "0". In this manner, when a series of transmission data of 64 bits is transmitted, since the data is switched to the next frame, the spread code generator 42 switches the spread code to "SCbi".

The spread modulation unit 41 transmits the spread code "SCbi" with no change when the transmission data is "1", and the spread modulation unit 41 inverts and transmits the spread code "SCbi" when the transmission data is "0". In this manner, when a series of transmission data of 64 bits is transmitted, since the data is switched to the next frame, the spread code generator 42 switches the spread code to "SCai".

The spread demodulation of the spread-modulated signal received by the communication base unit 7 of FIG. 4 is performed by multiplying the signal by the chips of the reference codes "Scai" and "Scbi" respectively in the spread demodulation unit 43a of the system "a" and the spread demodulation unit 43b of the system "b", and accumulating and adding the multiplied values in each 1-bit period (4095 chips).

The synchronization of the code phases in the code phase synchronization detection unit 45, in other words, synchronization of the data bits is realized by searching for the timing when the absolute value of the accumulated added value of this product-sum operation is the largest.

(d) and (e) in FIG. 5 show the spread demodulated data of the respective systems, and they are output to the selection unit 47. The spread demodulated data is obtained by determining the positive/negative polarity of the accumulated added value at the timing when the absolute value of the accumulated added value of the above-described product-sum operation is the largest.

Here, the symbol "-" represents that the level of data bit "0" or "1" was not determined since the accumulated added value did not exceed predetermined positive/negative threshold values as a result of determination of positive/negative polarity.

(f) in FIG. 5 shows the code phase synchronization signal which is output when code phase synchronization is achieved in the spread demodulation unit 43a. Reference number "52" denotes generation timing of the phase synchronization signal.

(g) in FIG. 5 shows the code phase synchronization signal which is output when code phase synchronization is achieved in the spread demodulation unit 43b. Reference number "53" denotes generation timing of the phase synchronization signal.

(d) and (f) in FIG. 5 correspond to each other, and "0" or "1" is output at the generation timing 52 of the phase synchronization signal. (e) and (g) in FIG. 5 similarly correspond to each other.

The frame synchronization detection unit 46 in FIG. 4 detects a timing of a change of the systems outputting phase synchronization signals (f) and (g) shown in FIG. 5 is changed (timing of frame boundary), and outputs the frame synchronization signal (h) shown in FIG. 5. Reference number "54" denotes a generation timing of the frame synchronization signal.

The selection unit 47 receives an instruction of the code-phase-synchronized spread demodulation system from the frame synchronization detection unit 46, selects the demodulated data (d) of the spread demodulation unit 43a shown in FIG. 5 or the demodulated data (e) of the spread demodulation unit 43b shown in FIG. 5, and outputs the received data (i) shown in FIG. 5.

The above receiving process in the communication base unit 7 is explained as an example, and various methods may be employed in the detection method of the code phase synchronization and in the selection of the system that is in a code phase synchronized state.

For example, the demodulation result of the spread demodulation unit 43a (the accumulated added value of the product-sum operation before level determination) is "R_Scai", and the demodulation result of the spread demodulation unit 43b is "R_Scbi". In this case, the larger absolute value of the absolute value of "R_Scai" and the absolute value of "R_Scbi" corresponds to the code-phase-synchronized received data, and positive/negative of the polarity of the demodulation result correspond to "1" and "0" of the received data, respectively.

When the system in which the received data is obtained is switched from one of "R_Scai" and "R_Scbi" to the other, frame switching is determined. Thus, frame synchronization in the receiving process can be easily achieved.

In the above-mentioned example, two spread codes "Scai" and "Scbi" are allocated to the communication extension unit 5a. However, spread code "SCci" may be further allocated to the communication extension unit 5a. The spread code "SCci" may be used for the frame for transmitting, for example, interrupt data for control from the communication extension unit 5a to the communication base unit 7 instead of transmitting normal monitoring data.

In this case, in the communication base unit 7, spread demodulation of three systems are processed at the same time by using the reference codes "Scai", "Scbi", and "SCci" corresponding to the spread codes allocated to the communication extension unit 5a.

Furthermore, three or more spread codes may be allocated when transmitting normal monitoring data. For example, the spread codes "Scai", "Scbi", and "SCci" are switched and transmitted in the frame unit. In the communication base unit 7, in the spread demodulation systems respectively using the reference codes "Scai", "Scbi", and "SCci", frame synchronization can be detected according to switching of the code-phase-synchronizable spread demodulation system, in other words, the synchronizable reference code.

The spread-modulated transmission signal superimposed on the transmission line by OOK (on/off keying) in a baseband in which the current value thereof is varied in two levels by a rectangular wave corresponding to spread-modulated outputs of "1" and "0".

Instead of this, digital modulation, such as 2PSK (2-phase phase modulation) or 4PSK (4-phase phase modulation), of the spread-modulated transmission signal may be performed with carrier wave (carrier), and spectrum spread communication in a carrier wave band is performed.

In the spectrum spread modulation communication system explained with reference to FIGS. 4 and 5, one communication extension unit 5a serves as a transmitting device, and one communication base unit 7 serves as a receiving device. On the other hand, in the spectrum spread modulation communication system of the solar power generation system shown in FIG. 1, a plurality of communication extension units 5a to 5f serve as transmitting devices, and one communication base unit 7 serves as a receiving device. The communication extension units 5a to 5f asynchronously superimpose the independently spread-modulated signals on the direct current power lines 2.

The communication base unit 7 is needed to separately receive spread-modulated signals from the communication extension units 5a to 5f. In order to do so, in the embodiment shown in FIG. 1, spread codes different from each other are respectively allocated to the communication extension units 5a to 5f. "Scai" and "Scbi" (i=1 to 6) are allocated to the corresponding communication extension units 5a to 5f. Therefore, 2×i kind of spread codes different from each other are used.

The communication base unit 7 performs spread demodulation of the system "a" and the system "b", and obtains the received data by using (2×i) kinds of reference codes "Scai" and "Scbi" (i=1 to 6) at the same time, and using the reference codes "Scai" and "Scbi" (i=1 to 6) with respect to the communication extension units 5a to 5f.

The type of the reference code used in the spread demodulation system in which the spread-modulated signal and the above-described reference code are in phase synchronization is identified, thereby specifying the transmitting device which has transmitted the data obtained by selecting the output of the spread demodulation system, in other words, any one of the communication extension units 5a to 5f serving as a transmission source.

The spread codes "Scai" and "Scbi" (i=1 to 6) different from each other may be arbitrarily allocated to the communication extension units 5a to 5f.

However, in the solar power generation system shown in FIG. 1, monitoring data which is obtained by monitoring the state of the solar battery panels 1a to 1f is transmitted to the monitoring device side. Therefore, devices to be monitored as targets are the solar battery panels 1a to 1f, and unique data for identifying the solar battery panels 1a to 1f, such as for example manufacturing number of a manufacturer such as SN001 to SN006 shown in FIG. 1, are respectively allocated to the solar battery panels 1a to 1f.

Therefore, the spread codes "Scai" and "Scbi" (i=1 to 6) individually allocated to each of the communication extension units 5a to 5f are allocated to the communication extension units 5a to 5f in advance by associating them with the unique data, for example, the manufacturing numbers of the manufacturer specifying the solar battery panels $1a$ to $1f$ from which the monitoring data transmitted by the communication extension units $5a$ to $5f$ is obtained.

The communication base unit 7 identifies the reference code which is used in the spread demodulation system in which the spread-modulated signal and the reference code are in phase synchronization state, thereby specifying the solar battery panels $1a$ to $1f$ from which the monitoring data corresponding to the obtained data is obtained by selecting the output of the spread demodulation system.

In this way, the solar battery panels $1a$ to $1f$ to be monitored as targets can be identified in the monitoring device side without inserting, for example, the above-described manufacturing numbers to the transmission data.

FIG. 6A is a circuit diagram showing one specific example of a driver in the communication extension unit $5a$ shown in FIG. 2.

In FIG. 6A, an output of a voltage driver 61 is connected to overvoltage protection diodes 62 and 63 between the direct current power lines $2a$ and $2b$, and the output is connected to the direct current power line $2a$ via series connection of reverse-polarity-connected constant-current elements 64 and 65 and a direct-current-blocking capacitor 66.

The voltage driver 61 outputs rectangular wave voltage corresponding to "0" and "1" of the code spread transmission signal from the CPU 17 shown in FIG. 2, and applies currents, which have current values having a constant amplitude and different polarities, to the direct current power lines $2a$ and $2b$ by the constant-current elements 64 and 65 (in this case, "positive" and "negative" of the polarities correspond to "on" and "off" of on/off keying).

The constant-current elements 64 and 65 also have a function of preventing reverse flow of large currents. The capacitor 66 is inserted for direct-current blocking.

FIG. 6B is a circuit diagram showing another specific example which may be used in place of the driver 18 in the communication extension unit $5a$ shown in FIG. 2.

This specific example is a simple and low-price driver connected in series to the current detector 12 of FIG. 2. A simple low-resistance resistor 71 is used as the current detector 12. As well as this resistor 71, a low-resistance resistor 72 is inserted to the direct current power line $2b$. Each of currents flowing along the direct current power lines $2a$ and $2b$ are changed in amplitude by a field effect transistor (FET) 73 which is turned on and off so as to switch both ends of the resistor 72 (shunt and open) in response to a code spread transmission signal (rectangular wave) from the CPU 17.

Finally, a case where the communication from the communication base unit 7 to the communication extension unit $5a$ is performed by using the control signal transmitting device 37 and the switch 38 shown in FIG. 3 and the control signal receiving device 19 shown in FIG. 2 will be explained hereinafter.

Such communication is utilized in case where the solar battery panel side or the communication extension units are controlled from the monitoring device side. The communication extension units are desired to be simple communication extension units in the above-described communication since there are limitations on the circuit scale or the scale of software.

Therefore, in the control signal transmitting device 37 in the communication base unit 7, the switch 38 is provided at a bypass between the direct current power lines $2a$ and $2d$, and the part between the direct current power lines $2a$ and $2d$ is caused to be in a state of short-circuit or low-resistance close to the short-circuit instantaneously. The solar battery panels $1a$ to $1f$ are not damaged, since the output current is limited in the short-circuit.

On the other hand, since electric power for the communication extension units $5a$ to $5f$ are supplied from the corresponding solar battery panels $1a$ to $1f$, the CPU 17 is reset when the output voltages of the solar batter panels $1a$ to $1f$ are reduced.

Therefore, by an instantaneous interruption pattern based on number of iterations and period of this pattern to put the direct current power lines $2a$ and $2d$ into a short state or a low resistance state in a short period of time before the CPU 17 is reset, several types of control signals are transmitted to one or more, or all the communication extension units $5a$ to $5f$ or all of the communication extension units.

In the communication extension unit $5a$ shown in FIG. 2, the control signal receiving device 19 detects a decrease in voltage between the direct current power lines $2a$ and $2b$ as an output of the voltage divider 11, detects the decreasing pattern in voltage in a short period of time (instantaneous interruption), and issues an instruction to control the solar battery panel $1a$ or the communication extension unit $5a$ determined in advance.

The spectrum spread communication system which performs, for example, monitoring of the power generation state of the solar battery panels using the direct current power lines serving as transmission line is explained in this embodiment. However, the present invention may be applied to Power Line Communication (PLC) in which commercial alternating-current power lines (which may include only interior wiring) serve as transmission lines. The present invention is also suitable for data transmission under various noise environments, for example, optical space transmission, optical fiber transmission, and wireless communication using weak radio waves, as well as the power line transmission lines. The transmission data is not limited to the monitoring data of the solar battery panels, but may be monitoring data obtained by monitoring the state of an arbitrary device.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A spectrum spread communication system comprising:
    a communication base unit which communicates with communication extension units, wherein:
    each of the communication extension units has:
    a spread code generator which switches and selectively outputs spread codes in each frame; and
    a spread modulation unit which performs spread modulation of frame-structured transmission data by using the spread codes from the spread code generator, and transmits a spread-modulated signal to a transmission line; and
    the communication base unit has:
    a reference code generating unit which generates a plurality of reference codes corresponding to the plurality of spread codes;
    spread demodulation units in respective spread demodulation systems, the spread demodulation units performing spread demodulation of the spread-modulated signal received via the transmission line by using the reference codes;
    a code phase synchronization detection unit which controls the phase of the reference codes from the reference code generating unit so that the spread-modulated signal is synchronized in phase with any one of the reference codes;

a frame synchronization detection unit which outputs a frame synchronization signal on the basis of timing of switching from a state in which the spread-modulated signal is synchronous with one reference code, to a state in which the spread-modulated signal is synchronous with another reference code; and a selection unit which selectively outputs, on the basis of the frame synchronization signal, signals demodulated by the spread demodulation units.

2. The spectrum spread communication system according to claim 1, in which in each of the communication extension units, a first spread code and a second spread code are allocated as the spread codes, and the spread modulation unit performs spread modulation of the frame-structured transmission data by alternatively switching and using the first spread code and the second spread code in each frame, first and second spread demodulation systems are defined as the spread demodulation systems, and the frame synchronization signal is used for identifying the frame structure on the basis of timing of alternatively switching between the first and second spread modulation systems in which the spread-modulated signal is synchronous with the reference codes.

3. The spectrum spread communication system according to claim 1, in which the transmission line is a transmission line through which direct-current power is supplied, in each of the communication extension units, the spread-modulated signal is superimposed on the direct-current power as a change in current flowing along the transmission line, and spread-modulated signal, which is received via the transmission line by the communication base unit, is received as a change in voltage of the transmission line.

4. The spectrum spread communication system according to claim 1, which is used in a communication system in which code division multiple access is performed between a plurality of transmitting devices and a single receiving device, in which the spread codes are allocated to the transmitting devices so that the allocated spread codes differ among the transmitting devices, the single receiving device has a plurality of spread demodulation systems which respectively use the reference codes corresponding to all of the spread codes allocated to the transmitting devices; and specifies a device which received monitoring data corresponding to data obtained by selecting the output of the relevant spread demodulation system, by identifying the reference code which is used in the spread demodulation system in which the spread-modulated signal is synchronous in phase with the reference code.

5. The spectrum spread communication system according to claim 4, in which the transmitting devices are adapted to transmit monitoring data obtained by respectively monitoring states of a plurality of devices, to the single receiving device as the frame-structured transmission data;

each of the devices has unique data for specifying the relevant devices;

a plurality of spread codes respectively allocated to the transmitting devices are codes which are allocated in advance to the transmitting devices in association with unique data for specifying a device which received monitoring data transmitted by the relevant transmitting device, the single receiving device specifies a device which received monitoring data corresponding to data obtained by selecting the output of the relevant spread demodulation system, by identifying the reference code which is used in the spread demodulation system in which the spread-modulated signal is synchronous in phase with the reference code.

6. The spectrum spread communication system according to claim 4, in which the transmission line is a direct current power line through which power generated by a plurality of solar battery panels is supplied to a load;

the frame-structured transmission data is monitoring data for the solar battery panels, measured by a measuring device provided to each of the solar battery panels;

the transmitting devices are respectively provided to the solar battery panels, and the receiving device is provided to a device for monitoring the solar battery panels.

\* \* \* \* \*